United States Patent
Preimesberger et al.

(10) Patent No.: US 11,329,816 B2
(45) Date of Patent: May 10, 2022

(54) ENCRYPTION KEYS FOR REMOVABLE STORAGE MEDIA

(71) Applicant: HEWLETT PACKARD ENTERPRISE DEVELOPMENT LP, Houston, TX (US)

(72) Inventors: Lee A. Preimesberger, Houston, TX (US); Jorge Daniel Cisneros, Houston, TX (US); Vartan Yosef Kasheshian, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 31 days.

(21) Appl. No.: 16/888,897

(22) Filed: Jun. 1, 2020

(65) Prior Publication Data

US 2021/0377019 A1     Dec. 2, 2021

(51) Int. Cl.
*H04L 9/08* (2006.01)
*H04L 9/14* (2006.01)
*G06F 21/79* (2013.01)

(52) U.S. Cl.
CPC ............ *H04L 9/0894* (2013.01); *G06F 21/79* (2013.01); *H04L 9/14* (2013.01)

(58) Field of Classification Search
CPC .......... H04L 9/0894; H04L 9/14; G06F 21/79
USPC ....................................................... 713/193
See application file for complete search history.

(56) References Cited

U.S. PATENT DOCUMENTS

| | | | |
|---|---|---|---|
| 5,201,000 A | 4/1993 | Matyas et al. | |
| 8,230,235 B2 | 7/2012 | Goodman et al. | |
| 8,549,297 B1 | 10/2013 | Topham et al. | |
| 9,734,093 B2 | 8/2017 | Lucky et al. | |
| 10,936,226 B2 * | 3/2021 | Kanno | G06F 3/062 |
| 2007/0083758 A1 | 4/2007 | Topham et al. | |
| 2017/0286698 A1 * | 10/2017 | Shetty | G06F 16/182 |

OTHER PUBLICATIONS

Gil Sever, "Best Practices for Removable Media Encryption," Network World, Jan. 7, 2009, pp. 1-5, Retrieved from the Internet on Mar. 24, 2020 at URL: <networkworld.com/article/2271728/best-practices-for-removable-media-encryption.html>.
Suny Downstate Medical Care, "Using Removable Media (USB Drive) Encryption (RME)," Nov. 1, 2018, pp. 1-3, Retrieved from the Internet on Mar. 24, 2020 at URL: <guides.downstate.edu/c.php?g=751138&p=5562922>.
Wikipedia, Trusted Platform Module last edited Apr. 6, 2020 (18 pages).

* cited by examiner

*Primary Examiner* — Kambiz Zand
*Assistant Examiner* — Phuc Pham
(74) *Attorney, Agent, or Firm* — Trop, Pruner & Hu, P.C.

(57) ABSTRACT

In some examples, a device receives a plurality of encryption keys from a secure storage of a management controller, where a first encryption key of the plurality of encryption keys is for site-wide access of information on removable storage media plugged into respective computers of a site, and a second encryption key of the plurality of encryption keys is to restrict access of information on removable storage media plugged into a subset of the computers. The device uses a given encryption key of the plurality of encryption keys to encrypt information written to or decrypt information read from a first removable storage medium plugged into a first computer of the computers, wherein the management controller is associated with and is separate from a processor of the first computer.

19 Claims, 5 Drawing Sheets

ENCRYPTION KEYS FOR REMOVABLE STORAGE MEDIA

BACKGROUND

Removable storage media can be plugged into computers to allow reading of information on the removable storage media or writing of information to the remote removable storage media. Examples of removable storage media include Universal Serial Bus (USB) storage media. USB storage media can have relatively large storage capacities and are relatively cheap. As a result, unauthorized persons or persons with malicious intent may either plug removable storage media with malicious payloads into computers of an organization to cause harm, or the unauthorized persons or persons with malicious intent may copy sensitive data of the organization onto the removable storage media to steal the sensitive data.

BRIEF DESCRIPTION OF THE DRAWINGS

Some implementations of the present disclosure are described with respect to the following figures.

Figure 1:
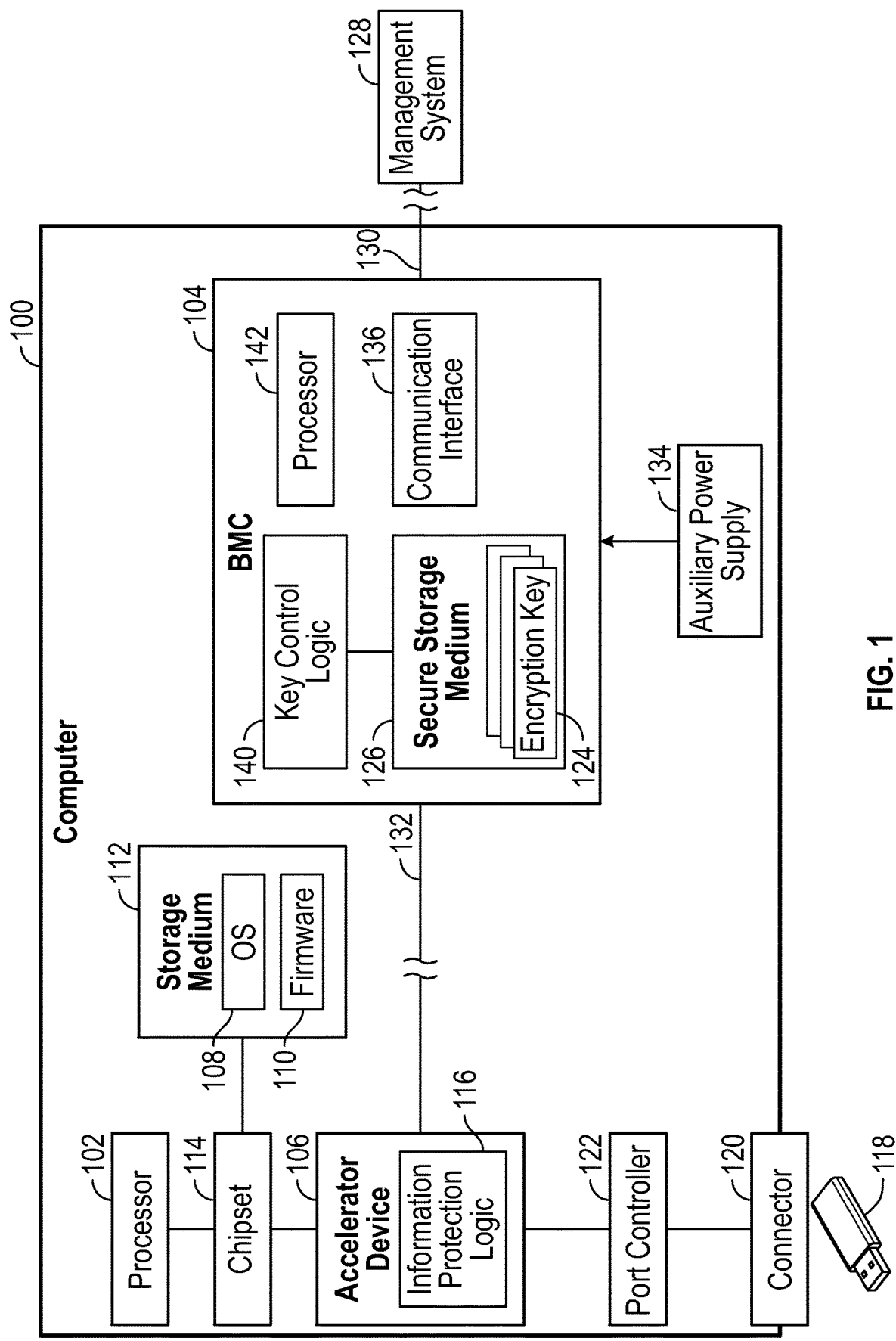
FIG. 1 is a block diagram of a computer according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "removable storage medium" can refer to a storage medium that is removably connected to a computer. The removable storage medium can have various form factors, such as any of the following: a stick, a fob, a physical key, a cartridge, etc. In further examples, the removable storage medium can have a larger form factor, such as in cases where the removable storage medium includes a disk-based storage device.

A removable storage medium can be plugged into a connector (e.g., an electrical connector or an optical connector) of the computer to allow the computer to access (read or write) information of the removable storage medium. When not in use, the removable storage medium can be unplugged (physically disconnected) from the connector of the computer. In other examples, the removable connection between the removable storage medium and a computer can be a wireless connection (e.g., a Bluetooth connection, a Near Field Communication (NFC) connection, etc.) that can be selectively established or disconnected.

A "computer" can include any or some combination of the following: a server computer, a desktop computer, a notebook computer, a tablet computer, a smart phone, a communication node (e.g., a switch, a router, etc.), a storage server, a vehicle or a controller of the vehicle, an Internet-of-Things (IoT) device, an appliance, and so forth.

For security, some organizations (e.g., businesses, schools, government agencies, individual persons, etc.) may disallow use of removable storage media on the organizations' premises. For example, persons may be prohibited from bringing removable storage media into (or taking removable storage media away from) an office building or other premises of an organization.

However, even with a policy that prohibits use of removable storage media, unauthorized persons or persons with malicious intent may nevertheless smuggle removable storage media (which are relatively small in size and can be easily hidden) into an organization in an attempt to cause harm or to steal data.

In accordance with some implementations of the present disclosure, a secure storage medium of a management controller can be used to store multiple encryption keys that can be used for accessing (writing or reading) information of removable storage media. The use of the encryption keys is to prevent a removable storage medium that was written outside of a site from being used within the site. Also, a removable storage medium containing information encrypted using any of the multiple encryption keys would not be accessible by a computer outside the site.

A "site" can refer to a network, a data center, an organization's premises (e.g., an office building, a campus, a home, a vehicle, etc.), or any other grouping of computers (whether geographically located in a certain region or distributed across a large region).

A secure storage medium of a management controller can be physically included as part of the management controller, or can be external of but accessible by the management controller.

The multiple encryption keys stored in the secure storage medium of the management controller can include a first encryption key that can be used for site-wide access of information on removable storage media plugged into respective computers of the site. For example, the first encryption key may be provided by an administrator of the site, and the first encryption key is intended to be available to all users at the site. As a more specific example, the administrator may set up a removable storage medium by encrypting information on the removable storage medium using the first encryption key. Then this removable storage medium can be used by anyone at the site who has possession of the first encryption key to read the encrypted information on the removable storage medium, or to write further information onto the removable storage medium using an additional encryption key that is different from the first encryption key.

The multiple encryption keys can include a second encryption key used for protecting and restricting access of information on removable storage media plugged into a first subset of the computers at the site, such as those computers associated with a first group of an organization at the site. For example, the first group of the organization can include a human resources group, a finance group, an executive team, and so forth. Further, the multiple encryption keys may also include a third encryption key used for protecting and restricting access of information on removable storage media plugged into a second subset of the computers at the site, such as those computers associated with a second group of the organization at the site.

In general, the use of multiple different encryption keys associated with corresponding different groups of the organization can allow for a compartmentalization of protection and access of information on removable storage media plugged into computers at the site, such that if a given computer used by a member of one group does not include an encryption key associated with another group that is used to store information on a particular removable storage medium, then the content of the particular removable storage media would not be accessible by the given computer.

In the foregoing examples, the site-wide first encryption key is provided to multiple groups of the organization so that users of the multiple groups can each access information of the removable storage medium using the first encryption key. The respective encryption keys (e.g., the second encryption key, the third encryption key, etc.) associated with the multiple groups are each individually associated with a corresponding group of the multiple groups, such that users of the corresponding group use the respective encryption key to encrypt information to be written to a removable storage medium, and any user belonging to another group that is not in possession of the respective encryption key would not be able to access the information encrypted with the respective encryption key.

FIG. 1 is a block diagram of a computer 100 that includes various electronic components, including a baseboard management controller (BMC) 104. The BMC 104 is an example of a management controller that is separate from a processor 102 of the computer 100. A processor can include any or some combination of the following: a microprocessor, a core of a multi-core microprocessor, a microcontroller, a programmable integrated circuit, a programmable gate array, or another hardware processing circuit. In other examples, the computer 100 can include multiple processors.

Although FIG. 1 shows the BMC 104 as being part of the computer 100, in other examples, the BMC 104 can be external of the computer 100.

In examples according to FIG. 1, the BMC 104 is able to communicate with an accelerator device 106 in the computer 100. The accelerator device 106 can include a processing circuit that is separate from the processor 102 of the computer 100. For example, the accelerator device 106 can include any or some combination of the following: a microprocessor, a core of a multi-core microprocessor, a microcontroller, a programmable integrated circuit, a programmable gate array, or another hardware processing circuit.

By performing given tasks by the accelerator device 106, the processor 102 of the computer 100 is not burdened with performing such given tasks. Thus, the processor 102 can execute machine-readable instructions of the computer 100, without being burdened with tasks that are performed by the accelerator device 106. The machine-readable instructions that can be executed by the processor 102 include an operating system (OS) 108, a firmware 110, an application program (not shown), and so forth. The OS 108, the firmware 110, an application program, and any other machine-readable instructions executable by the processor 102 can be stored in a storage medium 112 that is accessible by the processor 102. Examples of the storage medium 112 can include any or some combination of the following: a disk-based storage device, a solid-state storage device, a memory device, and so forth.

In some examples, the processor 102 accesses the storage medium 112 through a chipset 114. The chipset 114 can include a controller that is used to perform various control tasks of the computer 100, including managing access of the storage medium 112 and other input/output (I/O) devices. In some examples, the chipset 114 can include an I/O Controller Hub (ICH) from Intel Corporation. In other examples, other controllers can be included in the chipset 114.

In alternative examples, the processor 102 is able to access the storage medium 112 directly over a computer bus.

The accelerator device 106 includes an information protection logic 116 that is configured to protect and restrict access of information on a removable storage medium 118 that can be removably connected to a connector 120 of the computer 100. In some examples, the removable storage medium 118 can include a Universal Serial Bus (USB) storage device, which can be plugged into a USB port (an example of the connector 120).

The computer 100 includes a port controller 122 that controls communications through the connector 120 with an I/O device (e.g., the removable storage medium 118) connected to the connector 120. In examples where the connector 120 is a USB port, the port controller 122 can include a USB hub in the computer 100.

Although reference is made to USB in some examples, it is noted that other types of connectors, port controllers, and removable storage media can be used in other examples, which conform to other standards or protocols, whether proprietary, standardized, or open-source.

The information protection logic 116 can be implemented using a portion of the hardware processing circuit of the accelerator device 106, or alternatively, the information protection logic 116 can be implemented using machine-readable instructions executable by the accelerator device 106. In examples where the information protection logic 116 is implemented with machine-readable instructions, the information protection logic 116 can be stored in a storage medium of the accelerator device 106, or can be stored in a storage medium that is external of the accelerator device 106 but is accessible by the accelerator device 106.

The information protection logic 116 is able to protect information stored in the removable storage medium 118 by encrypting the information using any of various encryption keys 124. The information protection logic 116 can also use one of the encryption keys 124 to decrypt encrypted information stored in the removable storage medium 118.

In examples according to FIG. 1, the encryption keys 124 that are usable by the accelerator device 106 are stored in a secure storage medium 126 of the BMC 104. The encryption keys 124 can be provided to the BMC 104 from a remote entity, such as a management system 128 that is able to communicate with the BMC 104 over a communication link 130. The management system 128 can include a computer.

In other examples, the encryption keys 124 can be hard-coded into the secure storage medium 126.

The secure storage medium 126 can be implemented using a non-volatile memory. The non-volatile memory can be implemented using a non-volatile memory device (or multiple non-volatile memory devices), such as a flash memory device or any other type of memory device that maintains data stored in the memory device even if power is removed from the memory device.

In further examples, instead of providing the encryption keys to the BMC 104, information, such as key phrases or other seed information, can be provided (such as by the management system 128 or another entity) to the BMC 104. A key control logic 140 in the BMC 104 is able to derive the encryption keys 124 based on the key phrases or other seed information received by the BMC 104. For example, the key control logic 140 can apply a secure hash algorithm or other cryptographic hash algorithm on a key phrase (e.g., a human-input phrase such as a long password) or other seed information to generate a respective encryption key 124. In other examples, the key control logic 140 can apply other functions on a key phrase or other seed information to generate an encryption key 124.

The key control logic 140 stores the derived encryption keys 124 in the secure storage medium 126. In other examples where the encryption keys are received by the BMC 104 (such as from the management system 128 or from another entity), the key control logic 140 can store the received encryption keys 124 in the secure storage medium 126.

The BMC 104 is able to communicate with the accelerator device 106 over a secure connection 132 between the accelerator device 106 and the BMC 104.

A "secure connection" can refer to any communication medium, whether physical or logical, that protects the BMC 104 from unauthorized access by an attacker (e.g., a malware or unauthorized human). For example, the BMC 104 may reside on a communication channel (e.g., a bus, a network, etc.) that is not accessible by programs that may run in the computer 100, such as application programs or an operating system (OS). In other examples, communications over the secure connection 132 can be protected, such as by an encryption mechanism where information exchanged between the BMC 104 and the accelerator device 106 is encrypted. By employing the secure connection 132 to communicate with a component (e.g., the accelerator device 106) of the computer 100, the BMC 104 is protected against unauthorized access and thus the encryption keys 124 and other information stored in the storage medium 126 is considered to be "secure," i.e., a level of trust can be provided that information in the storage medium 126 has not been modified or written in an unauthorized way.

Although FIG. 1 shows an example where the information protection logic 116 is part of the accelerator device 106, in other examples, the information protection logic 116 can be part of the BMC 104. In further examples, the information protection logic 116 can be implemented using filters of the OS 108 or the firmware 110, where a "filter" can refer to a module (including machine-readable instructions) of the OS 108 or the firmware 110 that is used for managing the protection and restricted access of information of a removable storage medium, such as 118. In such examples where the information protection logic 116 is implemented with the BMC 104, an OS filter, a firmware filter, or any other component of the computer 100, the accelerator device 106 can be omitted from the computer 100.

As used herein, a "BMC" is a specialized service controller that monitors the physical state of a computer (such as 100) using sensors and communicates with the management system 128 (that is remote from the computer 100, for example) through an independent "out-of-band" connection (the communication link 130). The BMC 104 may also communicate with applications executing at an OS level through an input/output controller (IOCTL) interface driver, a Representational state transfer (REST) application program interface (API), or some other system software proxy that facilitates communication between the BMC 104 and application programs. The BMC 104 may have hardware level access to hardware components located in the computing device. The BMC 104 may be able to directly modify the hardware components (such as settings or configurations of the hardware components). The BMC 104 may operate independently of the OS 108 of the computer 100. The BMC 104 may be located on the motherboard or main circuit board of the computer 100 to be monitored by the BMC 104. The fact that the BMC 104 is mounted on a motherboard of the managed computer 100 or otherwise connected or attached to the managed computer 100 does not prevent the BMC 104 from being considered separate from a processing resource (e.g., 102 in the computer 100) that executes the OS 108. The BMC 104 has management capabilities to manage components of the computer 100. Examples of management capabilities of the BMC 104 can include any or some combination of the following: power control to perform power management of the computer 100 (such as to transition the computer 100 between different power consumption states in response to detected events), thermal monitoring and control of the computer 100 (such as to monitor temperatures of the computer 100 and to control thermal management devices of the computer 100), fan control of fans in the computer 100, system health monitoring based on monitoring measurement data of various sensors of the computer 100, remote access of the computer 100 (to access the computer 100 over a network, for example), remote reboot of the computer 100 (to trigger the computer 100 to reboot using a remote command), system setup and deployment of the computer 100, system security to implement security procedures in the computer 100, and so forth.

In some examples, the BMC 104 can provide so-called "lights-out" functionality for computers. The lights out functionality may allow a user, such as a systems administrator, to perform management operations on the computer 100 even if the OS 108 is not installed or not functional on the computer 100.

Moreover, in some examples as shown in FIG. 1, the BMC 104 can run on auxiliary power provided by an auxiliary power supply 134 (e.g., a battery); as a result, the computer 100 does not have to be powered on to allow the BMC 104 to perform the BMC's operations. The auxiliary power supply 134 is separate from a main power supply (not shown) that supplies powers to other components (e.g., the processor 102, the chipset 114, the storage medium 112, etc.) of the computer 100.

The services provided by the BMC 104 may be considered "out-of-band" services, since the OS 108 may not be running and in some cases the computer 100 may be powered off or is not functioning properly (e.g., the computer 100 has experienced a fault or hardware failure).

The BMC 104 can include a communication interface 136, such as a network interface and/or a serial interface, that a device of an administrator or other entity (such as the management system 128) can use to remotely communicate with the BMC 104. The communication interface 136 can include a transceiver for transmitting and receiving signals over a communication channel, as well as any protocol layer(s) associated with communication protocol(s) used for the communication of data over the communication channel. An out-of-band service can be provided by the BMC 104 via a dedicated management channel (e.g., the communication interface) and is available whether or not the computer 100 is in a powered on state.

The BMC 104 further includes a processor 142. In some examples, the key control logic 140 can be implemented as machine-readable instructions executable on the processor 142. Machine-readable instructions executable on a processor can refer to the instructions being executable on a single processor or the instructions being executable on multiple processors.

In other examples, the key control logic 140 can be implemented using a portion of the hardware processing circuit of the BMC 104.

Figure 2:
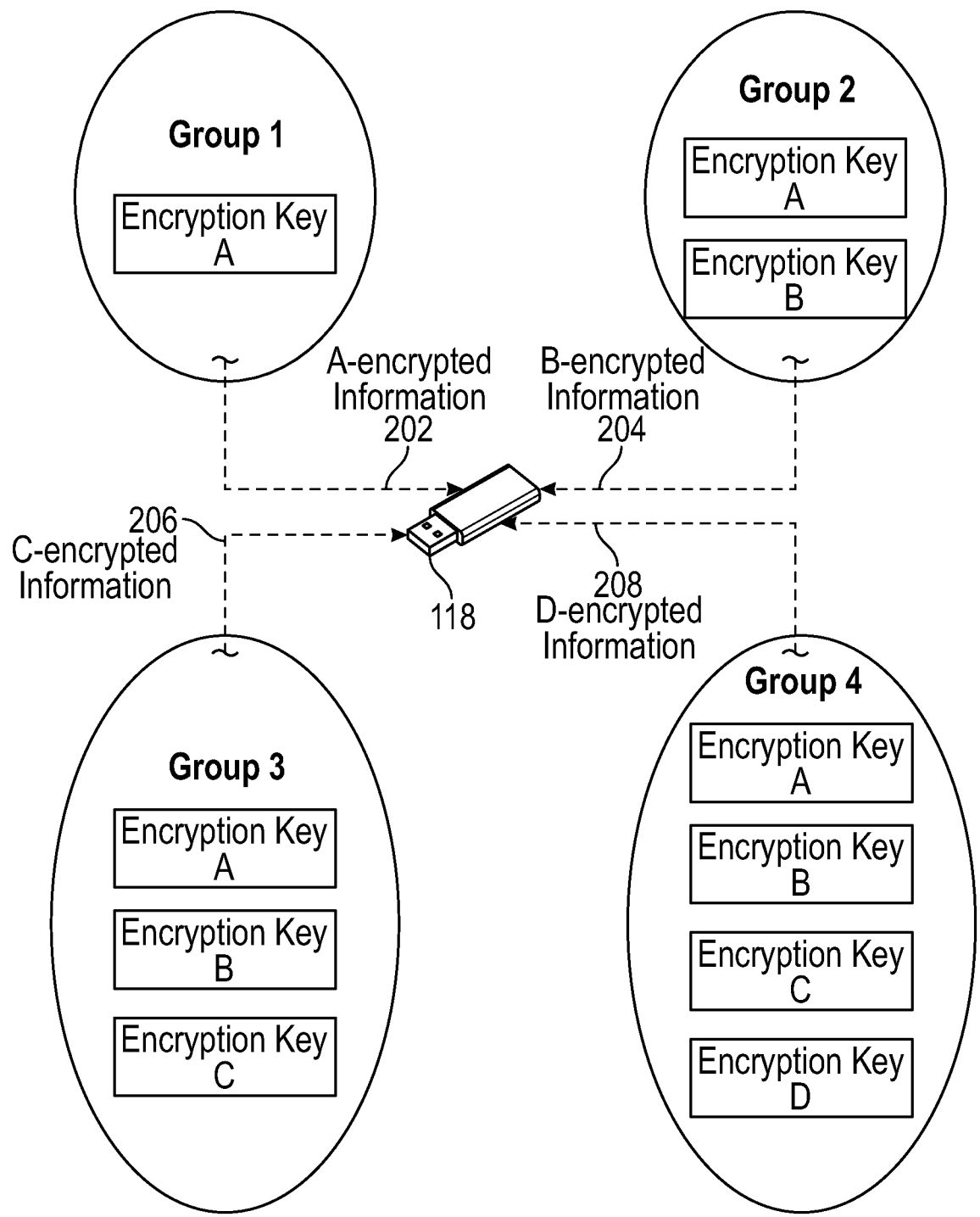
FIG. 2 illustrates groups associated with respective different collections of encryption keys, according to some examples.

FIG. 2 shows an example where four groups (Group 1, Group 2, Group 3, and Group 4) are shown. These groups can correspond to different groups of an organization, where each group can include a collection of persons. A "collection of persons" can refer to a collection of just a single person or a collection of multiple persons.

In specific examples, Group 1 can be an information technology (IT) group, Group 2 can be a human resources group, Group 3 can be a finance group, and Group 4 can be an executive team made up of executive officers and associated personnel.

Although specific examples of groups are listed, it is noted that in other examples, different example groups can be part of an organization.

As depicted in FIG. 2, each group includes a different number of encryption keys (i.e., members of the group are provided access to a respective different number of encryption keys). For example, Group 1 is associated with a single encryption key A, Group 2 is associated with encryption keys A and B, Group 3 is associated with encryption keys A, B, and C, and Group 4 is associated with encryption keys A, B, C, and D.

In examples according to FIG. 2, encryption key A can be considered a site-wide encryption key to use for site-wide access of information on removable storage media by computers associated with users of different groups. Since encryption key A is a site-wide encryption key, encryption key A is associated with each of the example groups shown in FIG. 2.

In an example, a computer associated with a user in Group 1 can encrypt information using encryption key A and write the A-encrypted information 202 to the removable storage medium 118. The information that can be encrypted using the encryption key A can include file system information that defines a file system structure of files stored by the removable storage medium 118. Examples of the file system information can include metadata associated with a file system. For example, for a File Allocation Table (FAT) file system, the file system information can include a boot sector area and FAT tables. For a New Technology File System (NTFS), the file system information can include a boot sector and a Master File Table (MFT). More generally, the file system information can include a boot area and tracking information that tracks the files of the file system. The boot area can be used to store machine-readable instructions that can be retrieved for booting a computer.

As an example, an IT administrator of Group 1 can write encrypted file system information (encrypted with site-wide encryption key A) to the removable storage medium 118 to set up the removable storage medium 118 for use by persons of other groups, including Groups 2, 3, and 4.

The encrypted file system information stored on the removable storage media 118 can be read by computers that are in possession of encryption key A (such as stored in the secure storage medium 126 of the BMC 104 of the computer 100 shown in FIG. 1).

Without encryption key A, a computer would detect the removable storage medium 118 as being an uninitialized removable storage medium (i.e., a removable storage medium that has not been formatted with a file system structure to allow for storage of files). Thus, if removable storage media 118 were plugged into a computer outside of a site and without possession of encryption key A, the outside computer would see the removable storage media 118 as being uninitialized (blank) since the outside computer is unable to read the encrypted file system information.

Additionally, in some examples, without encryption key A, a computer would not be able to boot from the boot sector of the removable storage medium. More generally, a computer without encryption key A would not be able to boot the computer from machine-readable instructions on the removable storage medium 118 that is plugged into the computer.

In some examples, users of any of Groups 2, 3, and 4 can write further encrypted information to the removable storage medium 118. Note that although just one removable storage medium 118 is shown in FIG. 2, it is noted that there may be multiple removable storage media 118 to which different persons of different groups can write encrypted information using their respective encryption keys.

Each group can be associated with a "default" encryption key, which is the encryption key that a user of the respective group would use to encrypt information onto a removable storage medium unless otherwise specified.

In examples according to FIG. 2, the default encryption key for Group 2 is encryption key B, the default encryption key for Group 3 is encryption key C, and the default encryption key for Group 4 is encryption key D. Thus, a computer associated with a user in Group 2 can encrypt information using encryption key B and write the B-encrypted information 204 to the removable storage medium 118 (or another removable storage medium). Similarly, a computer associated with a user in Group 3 can encrypt information using encryption key C and write the C-encrypted information 206 to the removable storage medium 118 (or another removable storage medium). A computer associated with the person in Group 4 can encrypt information using encryption key D and write the D-encrypted information 208 to the removable storage medium 118 (or another removable storage medium).

Computers associated with users of any of Groups 1, 2, and 3 would not be able to read the D-encrypted information 208; however, computers associated with users of Group 4 would be able to read the D-encrypted information 208. Computers associated with users of any of Groups 1 and 2 would not be able to read the C-encrypted information 206; however, computers associated with users of Group 3 or 4 would be able to read the C-encrypted information 206. Computers associated with users of Group 1 would not be able to read the B-encrypted information 204; however, computers associated with users of any of Groups 2, 3, and 4 would be able to read the B-encrypted information 204.

Moreover, none of the A-encrypted information 202, B-encrypted information 204, C-encrypted information 206, and D-encrypted information 208 are readable by a computer outside the site that includes Groups 1, 2, 3, and 4 that is not in possession of respective encryption key A, B, C, or D.

Figure 3:
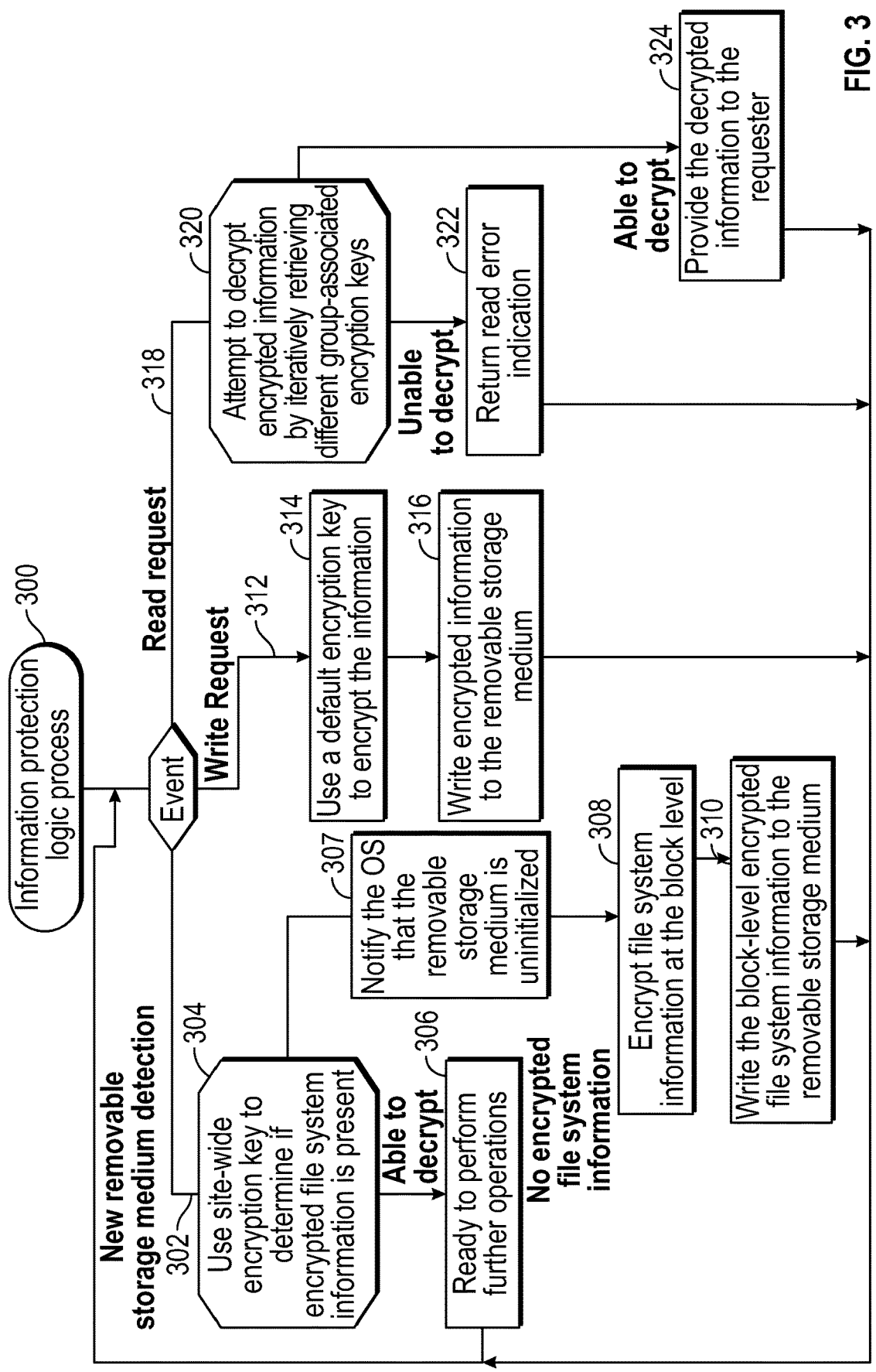
FIG. 3 is a flow diagram of a process for secure access of a removable storage medium, according to some examples.

FIG. 3 is a flow diagram of a process 300 of the information protection logic 116, which can be implemented in the accelerator device 106 of FIG. 1, the BMC 104, an OS filter, a firmware filter, or any other component of the computer 100. Various events can be detected by the information protection logic 116, where the events can include detection of a "new" removable storage medium, a read request, or a write request, as examples.

A "new" removable storage medium can refer to a removable storage medium that is newly plugged into the connector 120 of the computer 100 or a removable storage medium already present but detected by the computer 100 in response to initial startup of the computer 100.

In response to detecting "new" removable storage medium (302), the information protection logic 116 can use (at 304) a site-wide encryption key (e.g., encryption key A in FIG. 2) to determine if encrypted file system information is present on the removable storage medium. In examples where the information protection logic 116 is implemented with the accelerator device 106, an OS filter, or a firmware filter, the information protection logic 116 can establish a communication over a secure connection (e.g., 132) with the BMC 104 to retrieve the site-wide encryption key from the secure storage medium 126. For faster access of the encryption keys, retrieved encryption keys 124 can be stored in a memory (not shown), which can be part of or associated with the accelerator device 106 or can be part of the main memory of the computer 100, in some examples, or can be part of the BMC 104.

If the information protection logic 116 is able to decrypt encrypted file system information on the removable storage medium using the site-wide encryption key, then the information protection logic 116 is ready (at 306) to perform further operations with respect to the removable storage medium.

If there is no encrypted file system information on the removable storage medium, the information protection logic 116 can identify the removable storage medium 18 as being uninitialized. The information protection logic 116 can notify (at 307) the OS 108 that the removable storage medium is to be initialized (i.e., formatted with a file system structure). In response, the OS 108 can provide the file system structure to be written to the removable storage medium.

Next, the information protection logic 116 (either automatically or in response to a request from a user, a program, or a machine) encrypts (at 308) file system information (such as with the site-wide encryption key) at the block level. Encrypting information at the "block level" can refer to encrypting each block of a collection of blocks that make up the file system information. A "block" has a specified size. The information protection logic 116 writes (at 310) the block-level encrypted file system information to the removable storage medium, which effectively initializes (e.g., formats) the removable storage medium to be readable by other computers at the site, assuming the other computers have access to the site-wide encryption key.

In response to a write request (312) to write information to the removable storage medium 118, the information protection logic 116 uses (at 314) a default encryption key (for the group that a computer including the information protection logic 116 is associated with) to encrypt the information. The encryption of the information is also at the block level. After encryption, the encrypted information is written (at 316) by the information protection logic 116 to the removable storage medium.

In response to a read request (at 318) to read information of the removable storage medium (where the read request can be received from machine-readable instructions executed by the processor 102 or from another requester), the information protection logic 116 can attempt (at 320) to decrypt the encrypted information on the removable storage medium by iteratively retrieving different group-associated encryption keys (e.g., B, C, and D of FIG. 2) and using the retrieved group-associated encryption key to determine whether the encrypted information on the removable storage medium can be successfully decrypted.

If the information protection logic 116 is unable to decrypt the encrypted information on the removable storage medium with any of the iteratively retrieved group-associated encryption keys, then the information protection logic 116 can return (at 322) a read error indication.

However, if the information protection logic 116 is able to decrypt the encrypted information on the removable storage medium with a retrieved group-associated encryption key, then the information protection logic 116 can provide (at 324) the decrypted information to the requester.

Techniques or mechanisms according to some examples provide the ability to lock a site so that any removable storage media written at the site can be used at the site and not outside the site to prevent stealing of information of the site.

Techniques or mechanisms according to some examples can provide the ability to compartmentalize groups of computers inside a site through the use of multiple group-associated encryption keys.

Techniques or mechanisms according to some examples can provide the ability to safely do "courier" drops of sensitive data through out of band key sharing, such as using the out-of-band connection 130 in FIG. 1 to the BMC 104. For example, a movie studio can securely provide access to a new movie release by sharing a specific encryption key using the out-of-band connection 130.

Techniques or mechanisms according to some examples can provide the ability to manage and update encryption keys through the BMC 104, using any of the following techniques: communication according to a Lightweight Directory Access Protocol (LDAP), communication through a Representational State Transfer (REST) application programming interface (API), through a user interface (UI) presented by the BMC 104, and so forth.

Techniques or mechanisms according to some examples can provide the ability for a receiver of encrypted information on a removable storage medium to authenticate a creator of the encrypted information to ensure there is no tampering of the information.

Figure 4:
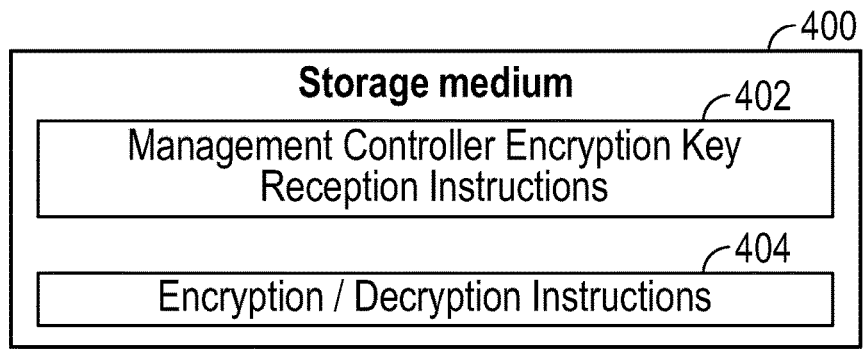
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a device to perform various tasks. The "device" can include any or some combination of the following: the accelerator device 106, the BMC 104, an OS filter, a firmware filter, and so forth.

The machine-readable instructions include management controller encryption key reception instructions 402 to receive a plurality of encryption keys from a secure storage of a management controller (e.g., the BMC 104). A first encryption key of the plurality of encryption keys is for site-wide access of information on removable storage media plugged into respective computers of a site, and a second encryption key of the plurality of encryption keys is to restrict access of information on removable storage media plugged into a subset of the computers (e.g., computer(s) associated with user(s) of a group).

The machine-readable instructions include encryption/decryption instructions 404 to use a given encryption key of the plurality of encryption keys to encrypt information written to or decrypt information read from a first removable storage medium plugged into a first computer of the computers, where the management controller is associated with and is separate from a processor of the first computer.

In some examples, in response to a read of the first removable storage medium plugged into the first computer, the encryption/decryption instructions 404 iteratively apply successive encryption keys of the plurality of encryption keys to find the given encryption key to use to decrypt encrypted information retrieved from the first removable storage medium.

In some examples, file system information on the first removable storage medium is encrypted with the given encryption key such that any computer without the given encryption key detects the first removable storage medium as an uninitialized removable storage medium.

In some examples, the machine-readable instructions are executable on the device to prevent booting from machine-readable instructions on a removable storage medium plugged into the first computer in an absence of the given encryption key.

In some examples, using of the given encryption key includes using the first encryption key to encrypt the information on the first removable storage medium that was uninitialized.

In some examples, the plurality of encryption keys are to prevent information written to the first removable storage medium by a computer of the site from being accessed by a computer outside the site.

In some examples, the plurality of encryption keys from the secure storage of the management controller excludes a third encryption key used to encrypt information on a second removable storage medium when plugged into a second computer of the computers, and the device is unable to access the encrypted information on the second removable storage medium when plugged into the first computer.

In some examples, the subset of the computers is a first subset of the computers, and the plurality of encryption keys further includes a third encryption key to restrict access of information on removable storage media plugged into a second subset of the computers that is different from the first subset of the computers.

In some examples, the plurality of encryption keys are updateable using the management controller.

Figure 5:
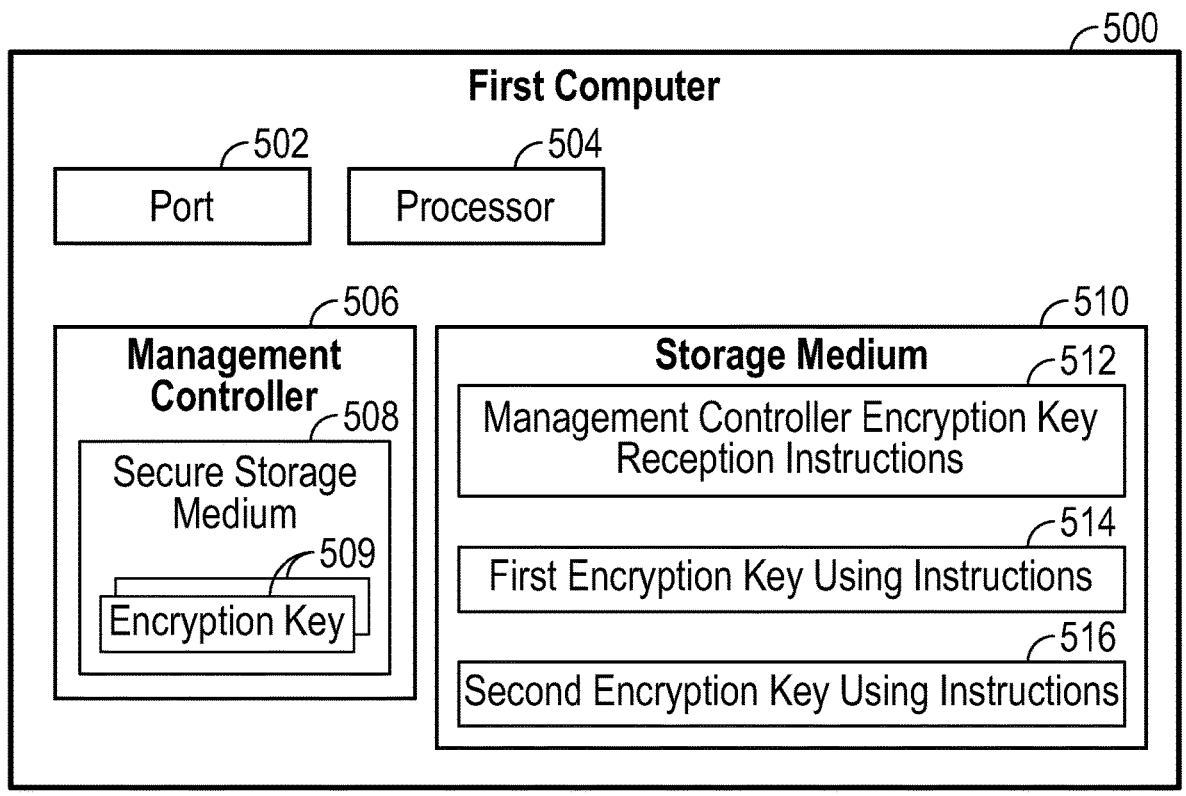
FIG. 5 is a block diagram of a computer according to further examples.

FIG. 5 is a block diagram of a first computer 500 that includes a port 502 (e.g., the connector 120 of FIG. 1) to receive a removable storage medium (e.g., 118 in FIG. 1).

The first computer 500 includes a processor 504 and a management controller 506 (e.g., the BMC 104 of FIG. 1) separate from the processor 504. The management controller 506 includes a secure storage medium 508 to store a plurality of encryption keys 509, which include a first encryption key for site-wide access of information on removable storage media plugged into respective computers of a site, and a second encryption key to restrict access of information on removable storage media plugged into a subset of the computers, the subset including the first computer. In further examples, plurality of encryption keys can include additional encryption key(s) for additional subset(s) of computers.

The first computer 500 includes a non-transitory storage medium 510 storing machine-readable instructions executable in the first computer to perform various tasks. For example, the machine-readable instructions can include firmware or software executable by the accelerator device 106 or the BMC 104, or the machine-readable instructions can be part of the OS 108 or the firmware 110 (FIG. 1).

The machine-readable instructions include management controller encryption key reception instructions 512 to receive the plurality of encryption keys from the management controller 506.

The machine-readable instructions include first encryption key using instructions 514 to use the first encryption key to decrypt encrypted information read from the removable storage medium plugged into the port, the encrypted information encrypted using the first encryption key by a second computer of the computers.

The machine-readable instructions include second encryption key using instructions 516 to use the second encryption key to encrypt information written to the removable storage medium plugged into the port.

In some examples, the machine-readable instructions detect a further removable storage medium plugged into the port 502 as uninitialized if the plurality of encryption keys excludes a third encryption key used to encrypt information stored in the further removable storage medium (e.g., the further removable storage medium was encrypted outside the site).

Figure 6:
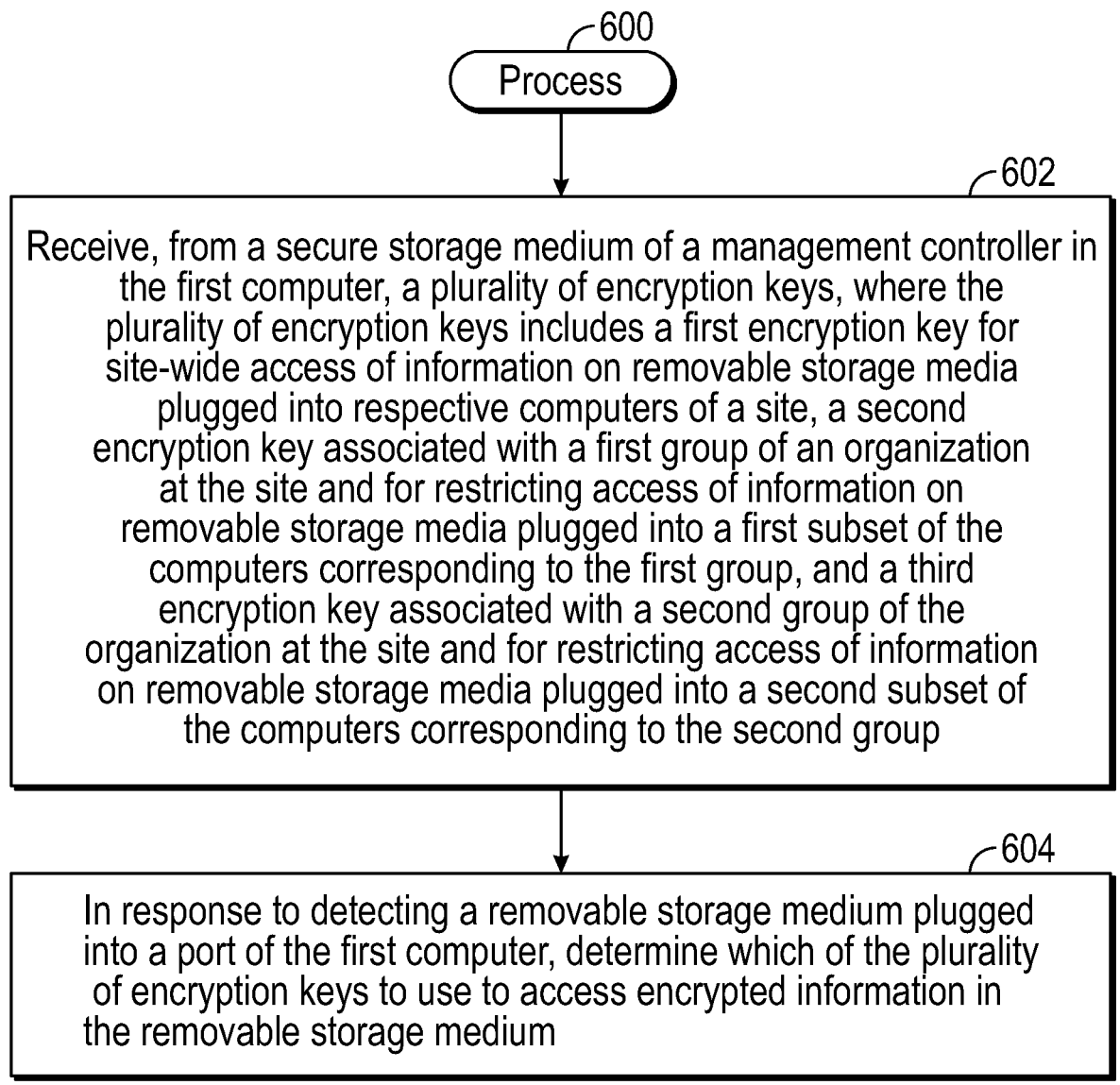
FIG. 6 is a flow diagram of the process according to some examples.

FIG. 6 is a flow diagram of a process 600 according to some examples. The process 600 can be performed by a first computer.

The process 600 includes receiving (at 602), from a secure storage of a management controller in the first computer, a plurality of encryption keys, where the plurality of encryption keys includes a first encryption key for site-wide access of information on removable storage media plugged into respective computers of a site, a second encryption key associated with a first group of an organization at the site and for restricting access of information on removable storage media plugged into a first subset of the computers corresponding to the first group, and a third encryption key associated with a second group of the organization at the site and for restricting access of information on removable storage media plugged into a second subset of the computers corresponding to the second group.

The process 600 includes, in response to detecting a removable storage medium plugged into a port of the first computer, determining (at 604) which of the plurality of encryption keys to use to access encrypted information in the removable storage medium.

In some examples, the process 600 can prevent a boot of the first computer using machine-readable instructions on the removable storage medium if the plurality of encryption keys excludes an encryption key used to encrypt the machine-readable instructions.

A storage medium (e.g., 126 in FIG. 1, 400 in FIG. 4, or 510 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a device to:
receive a plurality of encryption keys from a secure storage of a management controller, wherein a first encryption key of the plurality of encryption keys is for site-wide access of information on removable storage media plugged into respective computers of a site, and a second encryption key of the plurality of encryption keys is to restrict access of information on removable storage media plugged into a subset of the computers; and
use a given encryption key of the plurality of encryption keys to encrypt information written to or decrypt information read from a first removable storage medium plugged into a first computer of the computers, wherein the management controller is associated with and is separate from a processor of the first computer,
wherein file system information on the first removable storage medium is encrypted with the given encryption key such that any computer without the given encryption key detects the first removable storage medium as an uninitialized removable storage medium.

2. The non-transitory machine-readable storage medium of claim 1, wherein the instructions upon execution cause the device to:
prevent booting from machine-readable instructions on the first removable storage medium plugged into the first computer in an absence of the given encryption key.

3. The non-transitory machine-readable storage medium of claim 1, wherein the file system information on the first removable storage medium encrypted with the given encryption key comprises a boot sector area, and an inability to decrypt the boot sector area causes a computer to detect the first removable storage medium as uninitialized and prevents booting from the first removable storage medium.

4. The non-transitory machine-readable storage medium of claim 1, wherein the plurality of encryption keys are to prevent information written to the first removable storage medium by a computer of the site from being accessed by a computer outside the site.

5. The non-transitory machine-readable storage medium of claim 1, wherein the plurality of encryption keys from the secure storage of the management controller excludes a third encryption key used to encrypt information on a second removable storage medium when plugged into a second computer of the computers, and wherein the device is unable to access the encrypted information on the second removable storage medium when plugged into the first computer.

6. The non-transitory machine-readable storage medium of claim 1, wherein the subset of the computers is a first subset of the computers, and wherein the plurality of encryption keys further comprises a third encryption key to restrict access of information on removable storage media plugged into a second subset of the computers that is different from the first subset of the computers.

7. The non-transitory machine-readable storage medium of claim 1, wherein the device comprises one of the management controller or an accelerator device.

8. The non-transitory machine-readable storage medium of claim 1, wherein the instructions upon execution cause the device to:
in response to a read of the first removable storage medium plugged into the first computer, iteratively apply successive encryption keys of the plurality of encryption keys to find the given encryption key to use to decrypt encrypted information retrieved from the first removable storage medium.

9. The non-transitory machine-readable storage medium of claim 1, wherein the first encryption key is based on seed information.

10. The non-transitory machine-readable storage medium of claim 1, wherein the management controller from which the plurality of encryption keys is received comprises a baseboard management controller to perform any or a combination of a power management of the device or a thermal management of the device, while an operating system is not installed or is non-functional on the device, and while the baseboard management controller is powered by auxiliary power with power to the processor off.

11. The non-transitory machine-readable storage medium of claim 1, wherein the plurality of encryption keys are updateable using the management controller.

12. A first computer comprising:
a port to receive a removable storage medium;
a processor;
a management controller separate from the processor and comprising a secure storage medium to store a plurality of encryption keys, wherein a first encryption key of the plurality of encryption keys is for site-wide access of information on removable storage media plugged into respective computers of a site, and a second encryption key of the plurality of encryption keys is to restrict access of information on removable storage media plugged into a subset of the computers, the subset including the first computer; and
a non-transitory storage medium storing instructions executable in the first computer to:
receive the plurality of encryption keys from the management controller,
use the first encryption key to decrypt encrypted file system information read from the removable storage medium plugged into the port, the encrypted file system information encrypted using the first encryption key by a second computer of the computers, wherein the encrypted file system information comprises information that defines a file system structure of files, and wherein without the first encryption key the removable storage medium is to be detected as uninitialized by a computer, and
use the second encryption key to encrypt information written to the removable storage medium plugged into the port.

13. The first computer of claim 12, wherein the instructions are executable in the first computer to:
use the second encryption key to decrypt further encrypted information read from the removable storage medium plugged into the port, the further encrypted information encrypted using the second encryption key by another computer of the subset.

14. The first computer of claim 12, wherein the encrypted file system information comprises an encrypted boot sector area comprising instructions to boot a computer, and wherein without the first encryption key a computer would be unable to boot from the boot sector area.

15. The first computer of claim 12, wherein the second encryption key is associated with a first group of the site, and the instructions are unable to read further encrypted information on a further removable storage medium plugged into the port, the further encrypted information encrypted with a third encryption key associated with a different second group of the site.

16. The first computer of claim 12, wherein the instructions are executable on the management controller or an accelerator device separate from the processor in the first computer.

17. The first computer of claim 12, wherein the management controller is to update the plurality of encryption keys responsive to remote access from an entity external of the first computer.

18. A method of a first computer, comprising:
receiving, from a secure storage of a management controller in the first computer, a plurality of encryption keys, wherein the plurality of encryption keys comprises:
  a first encryption key for site-wide access of encrypted file system information on removable storage media plugged into respective computers of a site, wherein the encrypted file system information comprises an encrypted boot sector area, and wherein without the first encryption key a computer would detect a removable storage medium storing the encrypted file system information as uninitialized,
  a second encryption key associated with a first group of an organization at the site and for restricting access of information on removable storage media plugged into a first subset of the computers corresponding to the first group, and
  a third encryption key associated with a second group of the organization at the site and for restricting access of information on removable storage media plugged into a second subset of the computers corresponding to the second group; and
in response to detecting a removable storage medium plugged into a port of the first computer, determining which of the plurality of encryption keys to use to access encrypted information in the removable storage medium.

19. The method of claim 18, wherein the encrypted boot sector area comprises boot instructions to boot a computer.

* * * * *